United States Patent
Berliner

[15] 3,661,695
[45] May 9, 1972

[54] TWO WATER SOLUBLE FILMS CONNECTED TO EACH SIDE OF A WATER IMPERVIOUS SYNTHETIC MEMBRANE

[72] Inventor: Julius F. T. Berliner, Chicago, Ill.
[73] Assignee: M. D. Industries, Inc., Chicago, Ill.
[22] Filed: May 19, 1970
[21] Appl. No.: 38,777

[52] U.S. Cl. ............... 161/151, 161/164, 161/251, 161/252, 161/254, 161/267
[51] Int. Cl. .................. B32b 5/10, B32b 7/10, B32b 23/08
[58] Field of Search ............... 161/251, 250, 249, 252, 254, 161/265, 266, 267, 151, 164

[56] References Cited

UNITED STATES PATENTS

| | | | |
|---|---|---|---|
| 3,536,563 | 10/1970 | Brandts et al. | 161/251 X |
| 2,867,560 | 1/1969 | Strawinski | 161/402 X |
| 2,162,027 | 6/1939 | Muskat | 161/265 |
| 2,559,794 | 1/1951 | Prichard | 161/265 X |
| 2,408,682 | 10/1946 | Porter | 161/250 X |
| 2,734,012 | 2/1956 | Downing | 161/249 X |
| 3,342,902 | 9/1967 | Peterkin | 161/250 X |

Primary Examiner—John T. Goolkasian
Assistant Examiner—C. B. Cosby
Attorney—Alter, Weiss & Whitesel

[57] ABSTRACT

Two sheets of water soluble film are cemented together with a waterproof adhesive which forms a thin membrane. If either side of the laminated film is exposed to water, that side is dissolved quickly, but the membrane prevents the other side from becoming wet. The other water soluble side provides a mechanical strength, adequate to support the weight of water or other substances resting on the membrane. When the laminate is discarded into a water substance, the other side dissolves leaving only the membrane which is too weak to survive as a mechanical structure.

14 Claims, 13 Drawing Figures

Patented May 9, 1972

INVENTOR
JULIUS F.T. BERLINER

BY
Alter, Weiss and Whitesel
ATTORNEYS

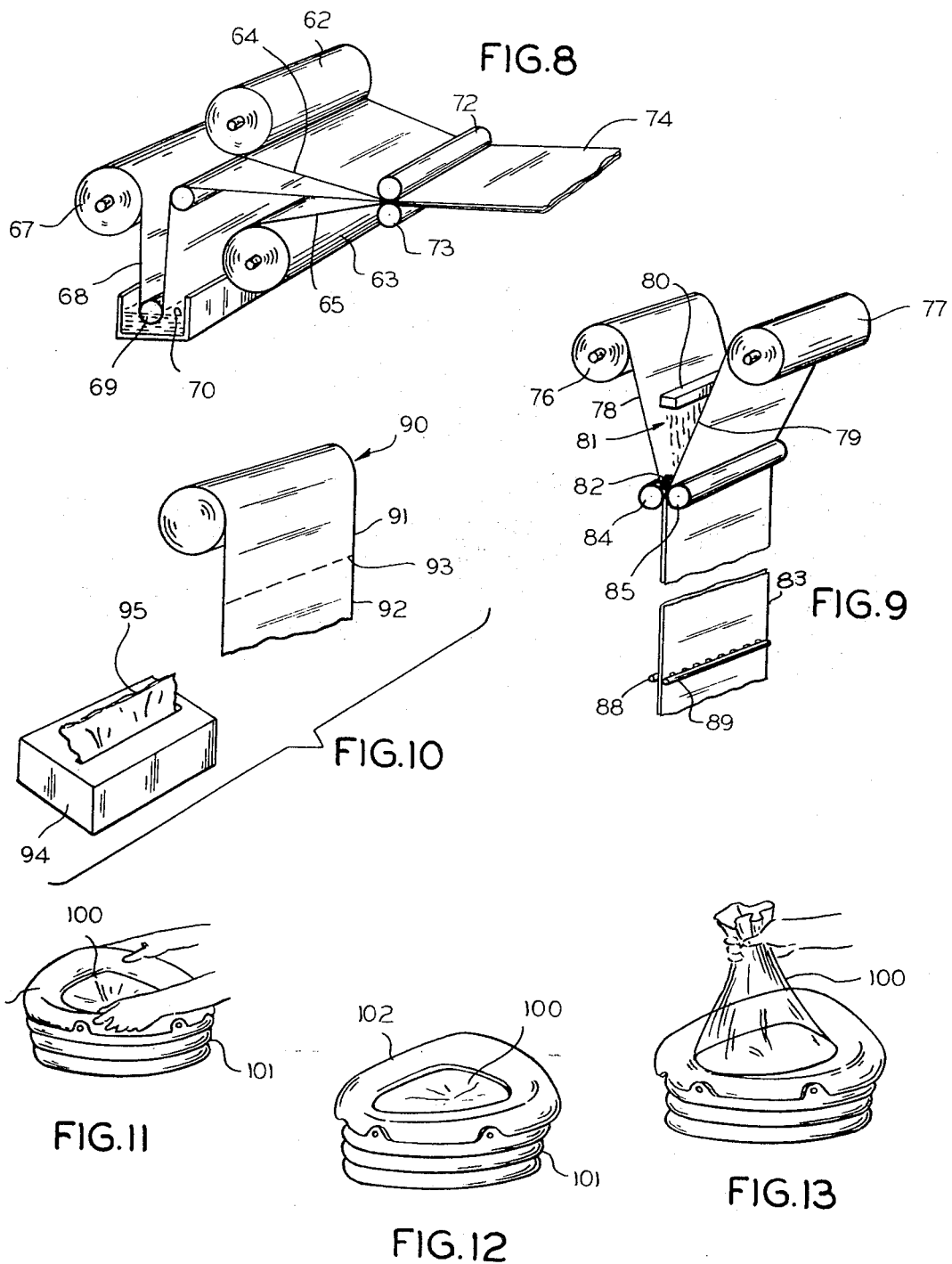

TWO WATER SOLUBLE FILMS CONNECTED TO EACH SIDE OF A WATER IMPERVIOUS SYNTHETIC MEMBRANE

This invention relates to water soluble materials and more particularly to water soluble materials capable of forming a container that can hold water or a substance containing water.

Water soluble materials are well known and widely used. Among other forms, these water soluble materials are very often made into film which, mechanically, is very strong. The film may then be fashioned into bags, containers, or the like, for holding non-water containing substances, for example. Of course, there are also many other uses for these materials.

Inherent to these and other uses is the general principle that a water soluble material can not be used as a container for water or for materials containing water. This is unfortunate since there is a pressing need for reduction of the trash which is currently defacing and polluting man's living space. Many polution problems would be solved by a water soluble packaging material which can contain products with a component of water.

There are many consequential benefits of a water soluble material that can be used as a water resistant material. For example, the modern hospital is a large user of water soluble products. However, the products are so restricted by their water solubility that they fail to solve many needs. For example, human perspiration is a water base material. Therefore, if a conventional water soluble sheet were placed under a bedridden patient, the patient's own perspiration would dissolve the sheet. Hence, the hospitals must still use rubber sheets or the equivalent thereof.

Still another hospital and institutional usage problem is illustrated and highlighted by the care and maintenance of bed pans. Presently, these pans are usually made of stainless steel, enameled steel, or of plastic. They are expensive to buy, and they require high labor cost for maintenance. The bed pans must be emptied, scrubbed, washed, and sterilized. The shape and nature of a bed pan inherently requires hand labor to provide these services, and this labor is costly and disagreeable. As a result, the pertinent labor turnover is very high, and this adds further to the already high health care costs.

There are other non-economic factors to be considered, such as the favorable psychological patient reaction to personal coverings for items such as bed pans, convenience of use, and the like.

Accordingly, an object of the invention is to provide new and improved water soluble, disposable materials, Here, an object is to provide a mechanically strong film which may be dissolved and disintegrated in water. In this connection, an object is to provide a film which may be discarded into a conventional sewerage system.

Another object is to provide a water soluble structure which may, nevertheless, contain and support either water or a water-containing substance. More particularly, an object is to provide a water soluble structure which dissolves only on proper disposal.

Still another object is to provide new and improved disposable liners for other containers. Here, an object is to provide means for fulfilling hospital needs for such disposable liners. In particular, an object is to provide disposable bed pan liners.

Yet another object is to provide methods and processes for making films of the described types.

In keeping with an aspect of this invention, these and other objects are accomplished by providing two sheets of water soluble film cemented together with a waterproof adhesive. The adhesive forms a waterproof membrane and results in a three-layer laminated structure. If either side of the laminated film is exposed to water, that side dissolves quickly. However, the membrane protects the other side and prevents it from becoming wet. The other water soluble side maintains a mechanical strength which is adequate to protect the membrane and to support the weight of the water or other substances. When the laminate is discarded into a water substance, the other side dissolves leaving only the waterproof membrane which is too weak a mechanical structure to withstand disintegration.

Preferred embodiments of the invention will become more apparent from a study of the attached drawings, in which.

Figure 1:
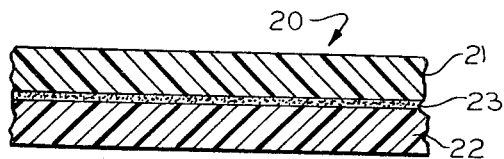
FIG. 1 is a cross-sectional view of a first embodiment of a laminated film structure incorporating the principles of the invention.

FIG. 5-9 schematically illustrate four exemplary methods of manufacturing the inventive film;

FIG. 10 schematically illustrates two convenience features of the invention wherein the film is dispensed as from a roll of perforated sheets or a box of folded sheets; and FIGS. 11-13 are three perspective views showing, by way of example, how the invention is used as a bed pan liner The nature and general principles of the invention may be understood best from a study of the preferred embodiment, as shown in FIG. 1. Here, the material is shown as a laminate structure 20 comprising two sheets 21, 22 of water soluble material separated by a waterproof membrane 23. The sheets 21, 22 are strong enough to support a substantial weight. The membrane 23 is mechanically weak enough to virtually disintegrate when deprived of the support afforded by the sheets 21, 22.

Various materials may be used to make the films which form the inventive laminated structure 20. In greater detail, the water soluble film 21, 22 may be any of the following materials: polyvinyl alcohol, carboxymethyl cellulose, hydroxyethyl cellulose, hydroxypropyl cellulose, methyl cellulose, and gelatin.

In view of the present day costs, the strength of the film and the multiple sources of supply, polyvinyl alcohol is preferred as the water soluble material 21, 22. However, the preferred material selection may change with the intoduction of new production techniques and suppliers. Accordingly, it may be well to here list a few of the characteristics which are to be sought when the selections are made. First, and most important, the material should have such a low cost that it is economical to dispose of it after a single use. Otherwise, there is little point in providing the material because other reusable materials would cost less. Second, and most important from an operational or utilitarian view point, the material comes into contact with the human body and, therefore, must be non-toxic, non- allergenic, and non-irritating. Third, the material must have relatively great mechanical strength, and it must be and remain flexible with a long storage life, through heat and cold.

Some of the trademarks or other designations which are applied to water soluble materials which have been tested and found satisfactory are: PVA: CMC; "Natrosol;" "Klucel," and "Methocel." Referring to "Klucel," by way of example, one may find a description of it in a bulletin, VCD-3A, dated Feb. 1, 1963, and published by the "Cellulose and Protein Department" of the Hercules Powder Company, Inc. of Wilmington, Delaware.

"Klucel," a Hercules trademark, is a cellulose propionate ether with water solubility characteristics. Water soluble films of "Klucel" can be produced from solution in organic solvents such as absolute alcohols, from water solution, or by conventional thermoplastic extrusion processes. The films are tough, flexible, and transparent.

The Hercules Company also sells an applicable product under its trademark "Natrosol." "Natrosol" is a white, odorless, tastless, free-flowing powder composed of hydroxyethyl cellulose which dissolves readily in cold or hot water to give clear, smooth, viscous solutions that are nonionic. Dermatology and toxicology studies showed no toxic effects.

The above described water solubles are exemplary of many similar products which may be used to form the layers 21, 22. Still other products are available, such as sodium carboxymethyl cellulose, known as "CMC."

The layer 23 belongs to the class of materials generally known as "pressure sensitive adhesives." Broadly speaking, the layer of adhesive 23 forms an extremely thin and fragile, somewhat rubber-like sheet which prevents water or moisture on one side of the laminate from reaching the water soluble layer on the other side of the sheet. This sheet is a water-impervious, but readily macerated or mechanically fragile film.

There are a number of compositions generally known as "pressure-sensitive adhesives" which can be used. These are various blends of natural and synthetic rubbers with rosins, polyvinyl acetates, ethylene-polyvinyl acetate copolymers (EVA), polyterpenes, hydrogenated rosins, rosin ester, acrylics, chlorinated parafins, ethyl cellulose, and a variety of other substances. Common and well known types of pressure sensitive adhesives are exemplified by those used on transparent cellophane adhesive tapes. These materials may be applied as solutions using solvents such as naphthas, toluene, chlorinated hydrocarbons, and the like. They may be applied by spraying, roller coating, or transfer rolls. It is also possible to apply the adhesive while it is in a molten state, which employs little or no solvent.

The characteristics of the adhesive are generally similar to those set forth above for the water soluble layers (e.g. non-toxic, non- allergenic, non-irritating, flexible, etc.). In addition, the adhesive should remain in a flexible state throughout its entire lifetime. Also, the membrane 23 formed from this adhesive should not only withstand water, moisture, and body fluids, it should also withstand medication, soap, and other chemicals normally used in hospitals to treat patients.

An example of a hot melt pressure sensitive adhesive is a blend of an EVA resin(ethylene-vinyl acetate copolymer) such as Du Pont's "Elvax- 40" vinyl acetate content 40 percent by weight, and a low melting point polyterpine resin, such as, "Picco- 75" produced by Pennsylvania Industrial Chemical Corporation (melting point 75° C.), in about equal proportions.

In one exemplary construction, each of the water soluble layers 21, 22 were in the range of ½ to 2 mils thick, and the adhesive layer 23 was in the range of 1/10 to 1 mil thick. The adhesive remained tacky and the laminate remained flexible over the temperature range of 0° to 350° F.

Figure 2:
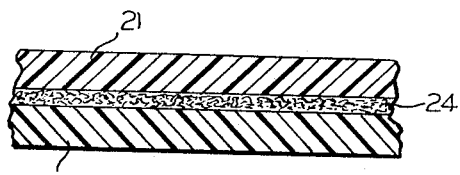
FIG. 2 is a cross-sectional view of a second embodiment of the inventive film.

FIG. 2 shows a second embodiment using water soluble films 21, 22, as described above. In addition, FIG. 2 shows that the center layer or membrane 24 may be a tissue impregnated with a pressure-sensitive adhesive. A monofilament fiber (such as nylon or rayon) is preferred as the major element of the tissue. Also some of the newer non-woven materials may be used.

Figure 3:
FIG. 3 is a schematic cross-sectional representation of a sheet of paper illustrating a problem to avoid when manufacturing the inventive laminate.

However, if conventional wood pulp fibers are used, care must be taken to insure a water impervious membrane at 24. For example, FIG. 3 schematically shows a sheet of paper, in cross-section, as having a number of randomly oriented wood fibers 27, which make up the bulk of the paper. Most of these fibers are a knotted mass; however, some of them (such as 28) might extend from one side of the tissue to the other side. If this side to side fiber 28 is present, it forms a tube for conveying moisture through the membrane 24. Thus, for example, if the water soluble layer 21 is exposed to water, it dissolves. Then, moisture might pass through the fiber tube 28, and the layer 22 is also dissolved to destroy the laminate. For this reason, a conventional paper is not the preferred embodiment.

Another factor to consider when selecting materials for the embodiment of FIG. 2, is the wet strength of the paper 24. If the paper 24 has a high degree of wet strength, it does not disintegrate after layers 21 and 22 have dissolved. Therefore, a use of this kind of paper defeats the purpose of the invention, except in special cases where a form of wet strength solves a particular need. In this case, a combination of dissolving in water plus burning of a residue might be require to dispose of the inventive material.

Figure 4:
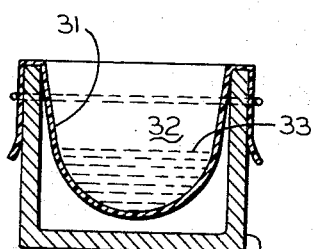
FIG. 4 is a schematic representation of a laboratory experiment which is useful in proving the theoretical aspects of the invention.

FIG. 4 depicts and accurately reflects a number of experiments which were actually conducted on a material constructed as taught herein. More particularly, a cup or bucket-shaped container 30 had a sheet of the inventive material 31 suspended over the open top, with slack material forming a bag-like liner inside the container. The bag area 32 was filled with hot water 33 and left standing in excess of 72 hours. The upper water soluble layer 21 was dissolved almost immediately. However, during the 72 hour period which followed, there was no leaking or detectable deterioration of either the membrane 23, 24, or layer 22.

FIGS. 5–9 disclose alternative and exemplary methods of manufacture which may be used to produce the inventive laminate. These methods are preferred; however, other methods may also be used. For example, a quantity of pressure sensitive adhesive may be rolled or spread over a water soluble film and the laminate may be completed by hand. The principle to be observed in all such manufacturing methods is that a film adhesion should be made, free of all wrinkles, air bubbles, or other defects which might form a void in the membrane.

Figure 5:
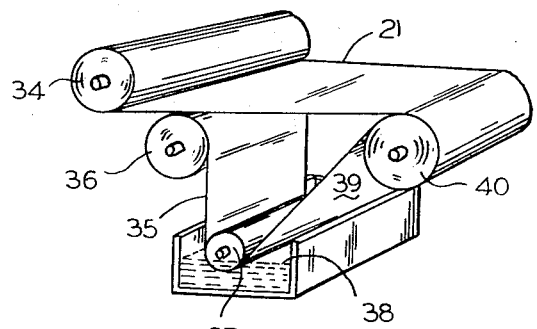

FIG. 5 shows a preferred method of applying a coating of a pressure sensitive adhesive to the water soluble film during manufacture. Here, the water soluble film 21 is first manufactured in any convenient manner and then rolled into a supply roll 34. Likewise, a roll of barrier paper 35 is also manufactured in any conventional manner and rolled into a supply roll 36. The barrier paper 35 has the ability to pick up a pressure sensitive adhesive; however, the adhesive will not stick to the barrier paper. This type of barrier paper is commonly found on the back of pressure sensitive labels, for example. The label is peeled off the barrier paper and then stuck on some other object.

The two supply rolls 34, 36 are suitably mounted, and webs of material 21, 35 drawn therefrom. The barrier paper is drawn from supply roll 36 and over a roller 37 immersed in a bath of adhesive material 38. As the barrier paper 39 emerges from the bath, adhesive material is clinging thereto. When the barrier paper, with its coating of wet adhesive, reaches a take-up roll 40, the adhesive is transferred to the surface of the web 21 of water soluble material. The adhesive then clings to material 21. Any suitable nipping rollers or doctor blades (not shown) may be provided to spread the adhesive, as required.

Thus, the roll 34 contains a supply of water soluble film 21. The roll 36 contains a supply of barrier paper 35. The roll 40 contains a laminate of water soluble material 21 and a backing of barrier paper 35 with one-half of the layer 23 of pressure sensitive adhesive therebetween.

Figure 6:
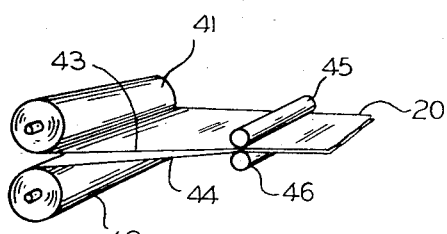

In FIG. 6, two supply rolls 41, 42 of water soluble film are provided with an adhesive layer already in place. These rolls are not too unlike two large rolls of pressure-sensitive cellophane tape. Or, each of these rolls might be a laminate of water soluble film such as roll 40, shown in FIG. 5. A web of the film 43, 44 is drawn from each roll 41, 42 with the adhesive sides coming into contact. If the barrier paper roll 40 is used, the barrier paper 39 is peeled away just before contact. These two contacted films 43, 44 are drawn through a pair of nipping rollers 45, 46 to form a bonded laminate 20. This laminate 20 is as described in connection with FIG. 1.

Figure 7:
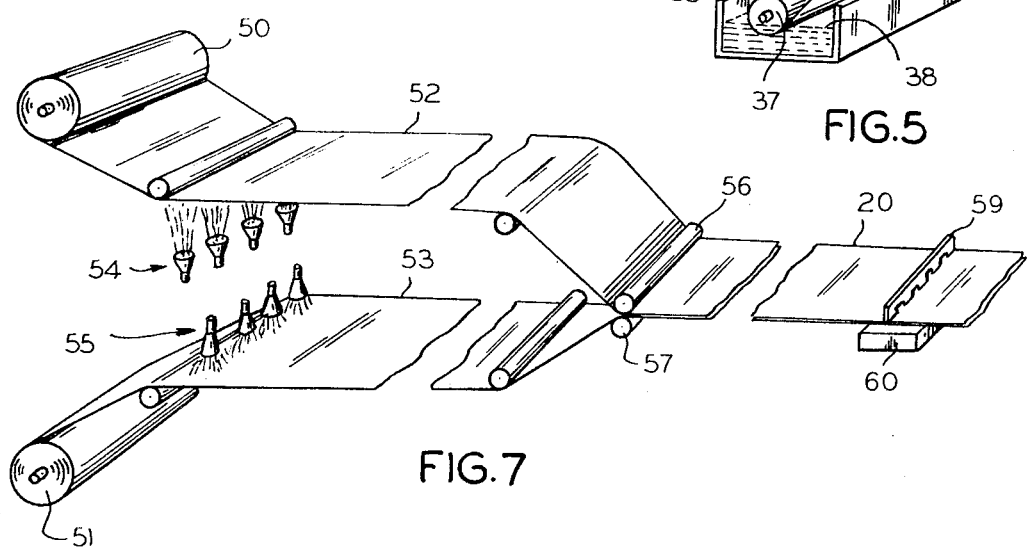

FIG. 7 shows an alternate method of manufacture. Here, a pair of supply rolls 50, 51 of water soluble film are suitably mounted. Then, a web of film 52, 53 is drawn from these rolls and pulled past 54, 55 for spraying an adhesive across the width of the film. The adhesive either air dries or is pulled through a heated area to accelerate the escape of the adhesive solvents. Then, the two tacky layers are brought together between a pair of nipping rollers 56, 57 to form the laminate 20. If desired, a rule die 59 may be driven into a punch block 60 to perforate the laminated sheet 20, thereby forming a series of perforated sheets.

FIG. 8 shows yet another manufacturing method which is particularly useful in connection with the embodiment of FIG. 2. The two supply rolls 62, 63 provide two continuous webs 64, 65 of water soluble film material. A third supply roll 67 provides a web 68 of tissue paper. This paper is made from a monofiliment filler. Or it is made with due care to avoid surface to surface fibers, as shown at 28 (FIG. 3). The tissue web 68 is drawn over a roller 69 immersed in a bath 70 for impregnating the paper with a pressure sensitive adhesive. Then the three webs 64, 68, 65 are brought together through a pair of nipping rollers 72, 73 to form a laminated structure 74 (similar to FIG. 2).

In still another embodiment (FIG. 9), two supply rolls 76, 77 provide continuous webs 78, 79 of water soluble film. A heated tray 80 contains a pressure sensitive adhesive which melts and drops, as at 81, to form a bead of adhesive 82 approximately one-quarter inch in diameter across the entire width of the valley formed by the two webs 78, 79, The laminate 83 is formed by pulling webs 78, 72, wetted by bead 82, through the nipping rollers 84, 85. A pair of electrodes 88, 89 are arranged to perforate the web 83 by burning a row of holes across the entire width thereof to form a series of perforated sheets.

Regardless of the manufacturing method which is used, the resulting perforated laminate structure may be rolled, as shown at 90 (FIG. 9), and suspended for ready use. As here shown, sheet 92 may be torn from sheet 91 along the perforation 93. Other convenient dispensors may comprise a box 94, having sheets of the laminated material folded therein so that as one sheet is taken, another sheet 95 appears.

An exemplary usage of the inventive laminated structure is shown in FIGS. 11-13. Here, a sheet 100 of the laminated structure (such as sheet 92) may be torn from roll 90, taken from box 94, or otherwise secured in any suitable manner. Then, this sheet 100 is placed over a bed pan 101 constructed to shield one side of the laminate from all moisture. Thereafter, a plastic seat 102 is placed over the sheet 100 to secure it in place and further insure that moisture does not reach the underside layer of water soluble material. FIG. 12 shows the bed pan and sheet 100 assembly ready for use.

After use, (FIG. 13), the liner 100 may be lifted out and discarded. The inside layer 21 of water soluble material will have already dissolved from the sheet 100, owing to any water content of material contained in the bag formed by the laminated sheet 100. However, the membrane 23 protects the lower water soluble layer 22, and it does not dissolve. When the material 100 is discarded, moisture first reaches the lower water soluble layer 22 which was previously protected by the bed pan 101, seat 102, and the membrane 23. Hence, the lower layer 22 dissolves, leaving only membrane 23 which is mechanically too weak a structure to exist independently of the tough layers 21, 22.

Therefore, a sheet 100 of the inventive laminated material 20 provides a suitable container for water or water bearing material. The material structure is strong and tough, readily available in any convenient form, such as from the supply roll 90 or a dispenser box (FIG. 9). There is no right or wrong side; thus, no special care is required. After it is no longer required, the material dissolves away in a normal sewer system and eliminates any trash disposal problems.

The invention is not limited to any particular use. Rather, a number of different convenient sizes of sheets of the inventive material may be stored at strategic locations. Whenever a need arises, the proper sheet size may be selected and used. Then it may be discarded. Accordingly, the invention is not to be construed as limited by the specific examples given herein.

Various uses of the laminated material will readily occur to those who are skilled in the art. Therefore, the appended claims are to be construed as covering all equivalents falling within the true scope and spirit of the invention.

I claim:

1. An integral laminated material comprising two water soluble films separated by a water impervious membrane, said two films and membrane being cemented together whereby said laminate adheres to form said integral structure, each of said water soluble films being a mechanical structure which is individually strong enough to support the remainder of said laminate after the other film has been dissolved in water, said membrane being too weak a mechanical structure to survive intact after both of said water soluble films have dissolved, and said laminate being flexible enough to be fitted within a confining mechanical enclosure without impairing the mechanical strength of said membrane when supported by a single one of said films.

2. The material of claim 1 wherein said membrane is formed by a pressure sensitive adhesive for cementing said water soluble films together.

3. The material of claim 1 wherein said films and membrane are selected from among classes of materials which are non-toxic, non- allergenic, and non-irritating to humans.

4. The material of claim 1 wherein said membrane is a water dispersible tissue of monofilament cellulose fiber impregnated with a pressure sensitive adhesive.

5. A flexible water soluble film container for water and materials containing water said film comprising water impervious means for indefinitely resisting passage of said water from either side through said film, and means for dissolving all of said container except said water impervious means when said container is immersed in water, said water impervious means being readily macerated in water after said container is dissolved.

6. The film of claim 5 and means for causing said film to dissolve on disposal.

7. The film of claim 5 wherein said film is a laminate of two water soluble layers cemented to and separated by a water-impervious membrane.

8. The film of claim 7 wherein said membrane is a pressure sensitive adhesive material.

9. The film of claim 8 wherein said adhesive material cements said two water soluble layers together, free of wrinkles and air bubbles.

10. The film of claim 9 wherein each of said water soluble layers is in the range of ½ to 2 mils thick and said membrane is in the range of 1/10 to 1 mil thick.

11. The film of claim 7 wherein said membrane is a tissue paper including a monofilament fiber film impregnated with a pressure sensitive adhesive material.

12. An integral laminated material comprising two sheets of a water soluble film forming polymer separated by a water impervious membrane, said membrane being too weak a mechanical structure to survive intact after said water soluble films have dissolved.

13. The laminated material of claim 12 wherein said film forming polymer is taken from a class represented by compounds such as methyl cellulose, cellulose propionate, hydroxyethyl cellulose, and sodium carboxymethyl cellulose.

14. The laminated material of claim 12 wherein said film forming polymer is taken from a class represented by polyvinyl alcohol and partially hydrolized polyvinyl acetate.

* * * * *